United States Patent [19]

McCullough

[11] Patent Number: 5,650,764
[45] Date of Patent: Jul. 22, 1997

[54] TRAILER ALIGNMENT DEVICE WITH VISUAL DISPLAY

[76] Inventor: Deborah Y. McCullough, 5507 E. 5th St., Tulsa, Okla. 74112

[21] Appl. No.: 295,559

[22] Filed: Aug. 25, 1994

[51] Int. Cl.$^6$ ...................................................... G08B 21/00
[52] U.S. Cl. ........................... 340/431; 250/206.1; 307/9.1
[58] Field of Search ................................... 348/118, 148; 340/431, 436, 686, 903; 250/206.1, 222.1; 307/9.1, 10.1

[56] References Cited

U.S. PATENT DOCUMENTS

| | | | |
|---|---|---|---|
| 3,825,921 | 7/1974 | Marus et al. | 340/282 |
| 3,924,257 | 12/1975 | Roberts | 340/282 |
| 4,187,494 | 2/1980 | Jessee | 340/52 R |
| 4,703,820 | 11/1987 | Reinaud | 250/206.1 |
| 4,854,604 | 8/1989 | Stallsworth | 280/477 |
| 4,938,495 | 7/1990 | Beasley et al. | 340/431 |
| 5,108,123 | 4/1992 | Rubenzik | 340/687 |
| 5,180,182 | 1/1993 | Haworth | 280/477 |
| 5,191,328 | 3/1993 | Nelson | 340/431 |
| 5,195,144 | 3/1993 | Le Parquier et al. | 382/1 |
| 5,253,050 | 10/1993 | Karasudani | 348/118 |
| 5,269,554 | 12/1993 | Law et al. | 280/477 |
| 5,281,947 | 1/1994 | Durley et al. | 340/436 |
| 5,289,321 | 2/1994 | Secor | 348/118 |
| 5,321,255 | 6/1994 | Kakinami et al. | 340/903 |
| 5,455,557 | 10/1995 | Noll et al. | 340/436 |

FOREIGN PATENT DOCUMENTS 1208246  2/1988  Japan ........................ 348/118

*Primary Examiner*—Jeffery Hofsass
*Assistant Examiner*—Timothy Edwards, Jr.

[57] ABSTRACT

A visual aid for assisting a driver backing up a towing vehicle to a drawn vehicle. A visual display includes a flat screen upon which are depicted images in the form of silhouettes or like simulations of the respective vehicles. This effect is provided by partially and selectively illuminating the screen. A sensor is placed on at least one of the vehicles for detecting relative alignment therebetween and proximity thereof. The sensor generates a signal which controls the screen. The silhouettes are moved on the screen in proportion to the actual relationship of the two vehicles. In a preferred embodiment, the image of the towing vehicle is stationary, and the image of the drawn vehicle moves responsive to input from the sensor. The sensor may employ an emitting coil and an induction coil, or may be of the reflected energy type, such as radar and infrared radiation. The display control preferably comprises a microprocessor. The visual aid has an on-off switch, a proximity readout, and an alarm annunciating the presence of an object interposed between the tow vehicle and the draft vehicle.

7 Claims, 3 Drawing Sheets

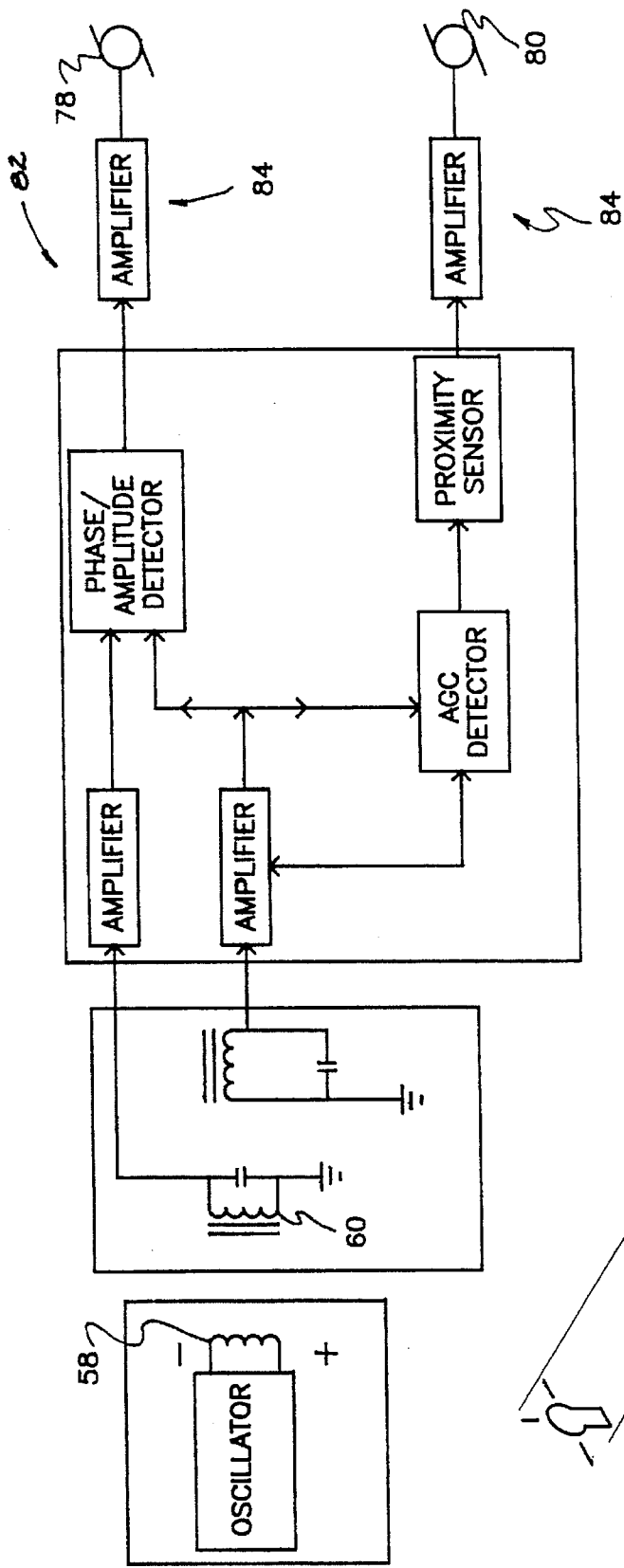
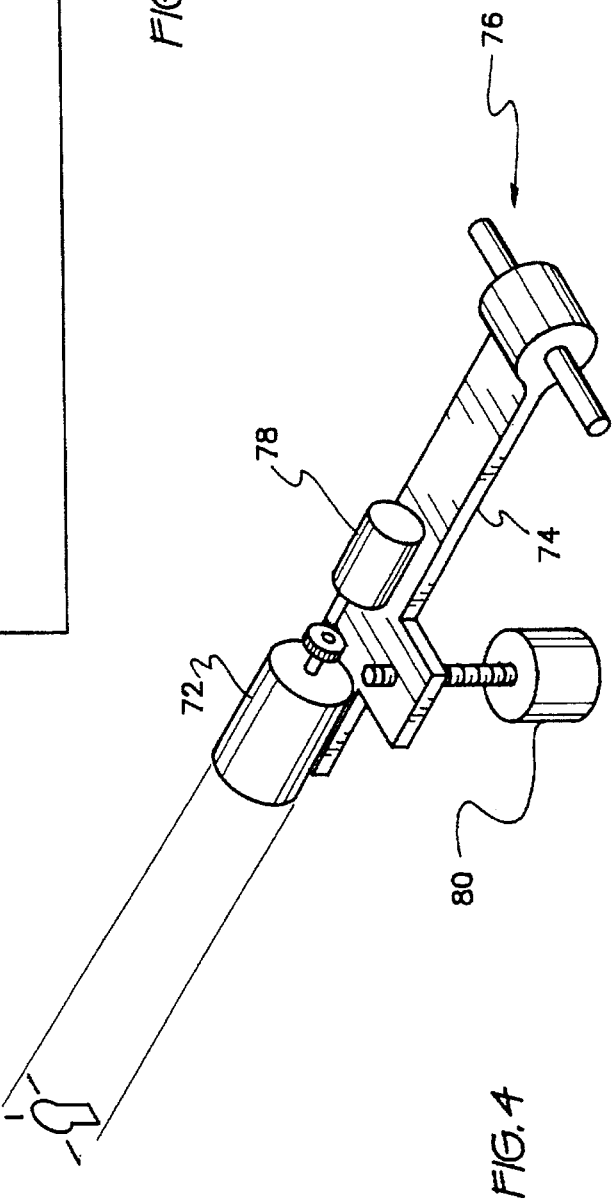
FIG. 5
FIG. 4

TRAILER ALIGNMENT DEVICE WITH VISUAL DISPLAY

BACKGROUND OF THE INVENTION

1. Field of the Invention

The present invention relates to a device for sensing the position of a motor vehicle relative to a trailer or other draft vehicle. The device includes a visual display representing the relative positions of the vehicles. The purpose of this invention is to assist in backing up a towing vehicle to a draft vehicle by providing a visual display proximate the operator.

2. Description of the Prior Art

Backing up a vehicle to another vehicle for the purpose of connecting the two vehicles, as for towing, is a difficult undertaking. The connection apparatus, which generally comprises an upwardly projecting ball fastened to the towing or tow vehicle, and a cooperating socket fastened to the draft or towed vehicle, are generally quite small, compared to the dimensions of the respective vehicles.

Maneuvering one vehicle into alignment with the second so that the aforementioned connection apparatus is properly aligned, and within close proximity so that the ball and socket can mate, is difficult. This is because mostly, vehicles are driven forward, whereas the present maneuver is conducted while backing up. Chassis behavior is considerably different when reversing the position of the steering road wheels, relative to the direction of motion. Most drivers are not highly experienced in dealing with reverse operation.

Compounding the above problem is that visibility to the rear is inadequate in most vehicles. This is especially true when considering that most balls and sockets are mounted at bumper level, which is generally low on the respective vehicle bodies. Thus, there is rarely a direct line of sight between the driver and either the ball or the socket. It is therefore virtually guesswork to estimate the relative positions of these components. An alternative would be to have a second person stand outside the vehicle, observe the relative positions, and give verbal instructions to the driver.

While an assistant would ameliorate the driver's task, there remains considerable room for improvement. Two ways of improving the driver's view of the relative positions of the vehicles is proposed in the prior art. U.S. Pat. No. 5,269,554, issued to Benjamin J. Law et al. on Dec. 14, 1993, discloses a direct visual aid for aligning two vehicles. The towing vehicle and the draft vehicle each have a telescoping indicator for direct viewing and aligning.

U.S. Pat. No. 5,180,182, issued to James R. Haworth on Jan. 19, 1993, discloses a mirror arranged to deflect a vehicle operator's line of sight advantageously around the tailgate of a pickup truck, so that he or she can observe alignment of the pickup truck with a draft vehicle.

Improvements upon the above schemes are seen in some arrangements wherein it is proposed to sense the relative positions automatically, and to provide the driver with instructions or other annunciation of the determined positions.

U.S. Pat. No. 3,825,921, issued to Louis J. Marus et al. on Jul. 23, 1974, and U.S. Pat. No. 3,924,257, issued to Jack E. Roberts on Dec. 2, 1975, are of some relevance to the present invention. These approaches employ an emitting coil and an induction coil. When out of axial alignment, parallel to vehicle axes, a control circuit generates a proportional signal.

Roberts provides two indicators for indicating, respectively, the direction and magnitude of misalignment. The indicators are of the visual type, such as needle gauges, preferably located in close proximity to one another in the cab of the vehicle. Thus, both indicators are within easy visual access of the driver. Marus et al. provides a single indicator in the form of a needle gauge.

Other automated schemes providing primarily audible indicators include U.S. Pat. No. 4,187,494, issued to John W. Jessee on Feb. 5, 1980, disclosing a vehicle alignment device having a tone generator simulating a human voice to deliver verbal instructions. The simulated instructions include the directions right and left.

Another example is U.S. Pat. No. 4,854,604, issued to Bradley E. Stallsworth on Aug. 8, 1989, disclosing a vehicle alignment device having an audible alarm. Stallsworth further states that the alarm could be visual, but provides no details.

The device of Roberts appears to offer more useful input to a driver than other prior art examples. However, direction and proximity are separately indicated, and it is extremely difficult for most drivers to take in at a glance the true respective positions of the two vehicles.

None of the above inventions and patents, taken either singly or in combination, is seen to describe the instant invention as claimed.

SUMMARY OF THE INVENTION

The present invention provides a single indicator which firstly provides information relating to both angle of alignment of the vehicle longitudinal axes, and also proximity therebetween. The present invention further provides this information in a form which is immediately useful to the driver. A display shows simulations of both vehicles, preferably in detail showing the critical components thereof, in top plan view.

The simulated showing of the vehicles is a major advance, in that it is relatively easy for a typical driver to assimilate and integrate data inputs relating to both angle of alignment and proximity of the vehicles when provided in this form. The most difficult task asked of the driver changes from correlating the two types of information, in prior art aids, to merely mastering the proportional relationship between the display and the actual relationship between the vehicles in the present invention.

This latter task is quickly mastered since the display immediately provides feedback showing both alignment and proximity in the easily understood format described above.

To accomplish this, the present invention comprises sensing apparatus fixed to one or both vehicles, for sensing relative positions and generating appropriate signals; apparatus for conveying these signals to commands controlling a visual display; and the visual display.

The sensing apparatus may include emitting and induction coils, as disclosed in Roberts and Marus et al. Alternatively, other sensing arrangements, such as radar and infrared emitters and detectors, are described.

The visual display includes an illuminated screen displaying images representative of the two vehicles, preferably showing top plan views thereof. The display is preferably controlled by a microprocessor.

Accordingly, it is a principal object of the invention to provide a visual display representing and simulating both the towing vehicle and the draft vehicle, showing the two vehicles in their actual relative positions.

It is another object of the invention to provide a display indicating relative positions of the two vehicles which is arranged in a manner conducive to immediate spatial cognition by the operator of the towing vehicle.

It is a further object of the invention to provide a visual display proximate the operator of the towing vehicle.

It is an additional object of the invention to indicate a magnitude of proximity of the towing vehicle to the draft vehicle.

It is again an object of the invention to indicate both alignment and proximity in a single visual indicator.

Another object of the invention is to control the visual display by a microprocessor.

Yet another object of the invention is to provide a visual display in the form of a screen which is partially and selectively illuminated to define indicia thereon.

Still another object of the invention is to provide indicia upon the visual display which simulates the vehicles from the perspective of top plan view.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a detail view showing components controlling the visual display of FIG. 3.

FIG. 5 is a diagrammatic view showing a control scheme for operating the embodiment of FIG. 3.

Similar reference characters denote corresponding features consistently throughout the attached drawings.

DETAILED DESCRIPTION OF THE PREFERRED EMBODIMENTS

Figure 1:
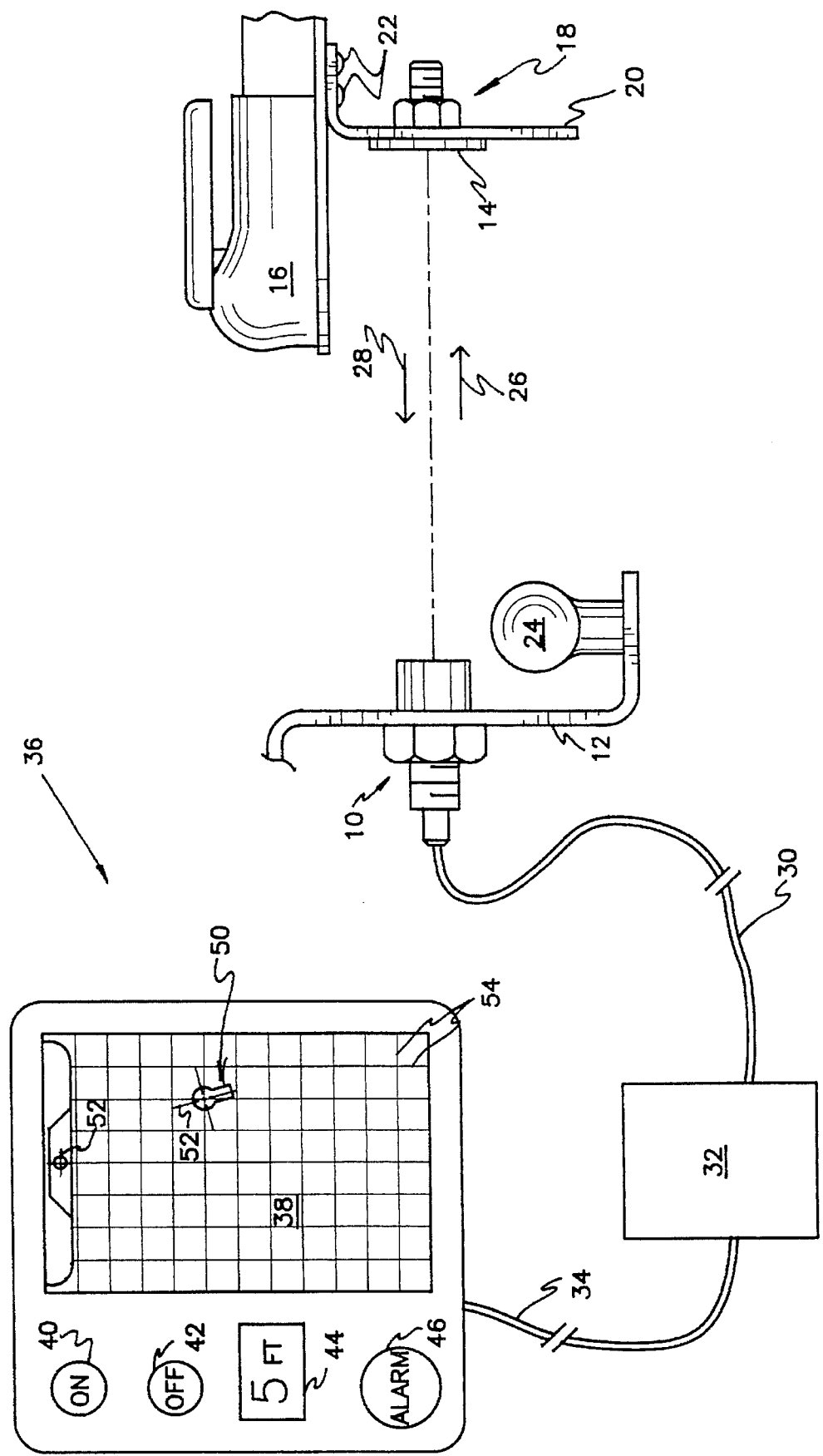
FIG. 1 is a diagrammatic view of the components of a preferred embodiment of the invention.

A preferred embodiment of the present invention is shown diagrammatically in FIG. 1. A signal emitter and receiver 10 is mounted to the bumper 12 of the tow vehicle (not shown in its entirety). Emitter and receiver 10 both projects energy, such as radar and infrared radiation, and detects reflected projected energy. This energy is directed toward a reflector 14 mounted to the coupler or socket 16 of the draft vehicle (not shown in its entirety), as by bolting, generally indicated at 18, to a bracket 20. Bracket 20 is, in turn, fastened to socket 16 or a related component, as by screws 22.

It is preferred that socket 16 be adjusted to a level above the ball 24 secured to bumper 12, so that when vertical alignment between ball 24 and socket 16 is achieved, the trailer tongue (not shown) is lowered into place, socket 16 interfitting with ball 24. This situation is illustrated in this Figure.

Energy being emitted from emitter and receiver 10 is indicated by arrow 26, and reflected energy is indicated by arrow 28. Reflected energy is detected by well known apparatus contained within emitter and receiver 10, and is converted into an appropriate signal. This signal is conducted by a cable 30 which also brings power to emitter and receiver 10 to a microprocessor 32. Microprocessor 32 is programmed in well known fashion to process data provided by the input signals, and to convert the data into command signals.

These command signals are carried by cable 34 to a visual display 36.

Visual display 36 has a screen 38 of well known type, such as liquid crystal display (LCD) or having a plurality of selectively illuminable lamps. Display 36 also has "on" and "off" pushbuttons 40,42, a proximity annunciator 44, and an alarm 46. Alarm 46, which may be audible or visible or both, indicates when energy is emitted but not detected, even at the weakest level. When the tow vehicle is initially aligned with the draft vehicle by sight, even a weak signal will be detected. In this case, the lack of a signal is likely to indicate that an object has been interposed between the two vehicles. The driver is thus alerted to look for another vehicle being operated in the vicinity, or for a pedestrian, or any other object which may interfere with backing up to the draft vehicle.

Three components of indicia appear upon screen 38. An image 48 representative of the tow vehicle is shown in a constant location on screen 38. A second image 50 representative of the draft vehicle is shown, and moves responsive to changing signals which are progressively generated as emitter and receiver 10 constantly receives new inputs. Preferably, images 48 and 50 are configured to simulate a recognizable feature of their respective vehicles. This is accomplished in one embodiment by showing the outline or silhouette of the rear of the tow vehicle and of the coupler or socket 16 of the trailer. More specifically, the outlines or silhouettes of the rear of the tow vehicle and of coupler or socket 16 are rendered in top plan view, as clearly shown in FIG. 1.

Image 50 preferably includes a cross hair 52 or the like for making it easy to discern the discrepancy of the angle of alignment. The third component is a grid 54 which also helps discern relative alignment. Grid 54 is constantly displayed in unchanging form, as is the case with image 48.

The data determining proximity is separately annunciated in annunciator 44, for the convenience of the driver. This information helps the driver select an appropriate speed when maneuvering.

Figure 2:
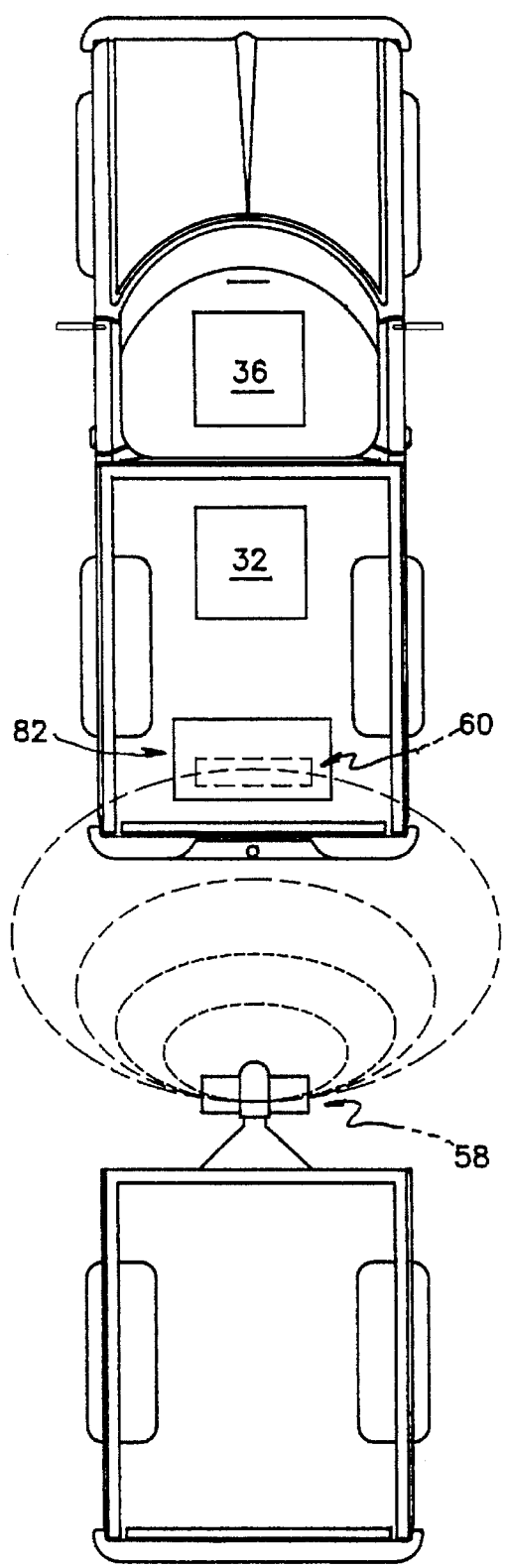
FIG. 2 is a diagrammatic view showing a second embodiment wherein of a prior art proximity and alignment sensor is incorporated into the present invention.

The scheme described above employing microprocessor 32 and visual display 36 would work equally well with other data gathering systems. FIG. 2 shows how a system employing an emitting coil 58 and an induction coil 60 could be incorporated to be operable with the present invention. A system of this type is well known in the prior art, and an example is set forth in greater detail in U.S. Pat. No. 3,924,257, to Roberts, cited above. This patent is incorporated herein by reference, and the information presented therein thus will not be set forth in full detail in this document.

Microprocessor 32 is connected to the output of coils 58, 60, with amplifiers provided as required. Microprocessor 32 then controls visual display 36 in the manner described above.

Figure 3:
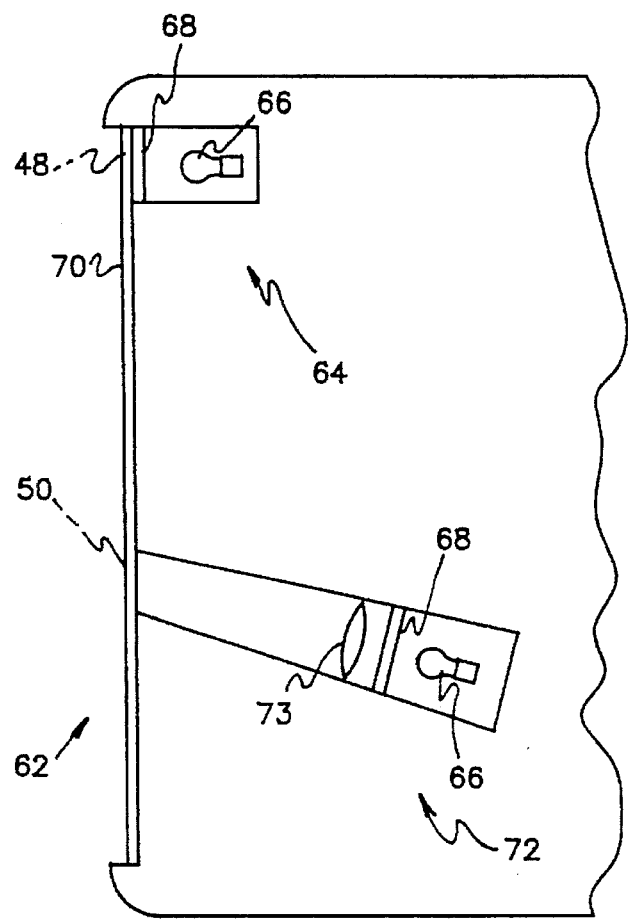
FIG. 3 is a detail view of a visual display of still another embodiment.

FIG. 3 illustrates another embodiment of visual display. Visual display 62 has a constant image 48, projected by a fixed projector 64. Projector 64 includes a lamp 66 and a template 68 or equivalent apparatus, such as a projection slide, for generating image 48. A grid (not shown) may also be provided, either by projection or by inked lines made on screen 70, or in another suitable way.

Image 50 is projected by a movable projector 72, which has a focussing lens 73, as well as a lamp 66 and template 68. Projector 72 is explained in greater detail with reference to FIG. 4. Projector 72 is supported on a suitable tab 74, which is pivotally journaled to a sturdy and stationary portion (not shown), as indicated at 76. A first adjustment motor 78 rotates projector 72 axially, to indicate angular misalignment between the tow and draft vehicles. A second adjustment motor 80 raises and lowers projector 72 to indicate changes in proximity.

Turning now to FIG. 5, it will be explained how an emitter and induction coil system 82, typified by Roberts is employed to accomplish the control scheme illustrated in FIG. 4. Emitting and induction coils 58, 60 and related components are employed as disclosed by Roberts. Respective alignment and proximity signals generated thereby are suitably amplified, as at 84, and the amplified signals operate motors 78, 80.

Operating power is derived from the battery of the tow vehicle in well known fashion, and may include fuses or circuit breakers to increase operating safety and reliability. For components mounted to the trailer, commercially available battery cells may be provided and connected as required.

Thus, a driver's visual aid has been described which uses any of several detection circuits, and has a visual display which flashes representative images of the vehicles on a screen. The screen is partially and selectively illuminated, as by selectively illuminating lamps, by projecting light selectively thereonto, or by any other suitable method. The screen is preferably located in the driver's cab for ready visual access.

In peripheral functions, the inventive device annunciates the distance between the two vehicles, and detects and annunciates the presence of a foreign object interposed between the tow vehicle and the draft vehicle.

It is to be understood that the present invention is not limited to the embodiments described above, but encompasses any and all embodiments within the scope of the following claims.

I claim:

1. An aid for a driver backing a tow vehicle up to a draft vehicle, comprising:
   a. means for sensing the relative positions of the tow and draft vehicle and generating signals responsive thereto, said sensing means mounted upon the tow vehicle;
   b. said sensing means comprising an infrared transmitter which transmits a signal to a draft vehicle which reflects from reflecting means on the tow vehicle back to the draft vehicle;
   c. a visual display receiving an output from said receiving means and displaying a first image representative of the tow vehicle and a second image representative of the draft vehicle;
   d. and whereby if no signal is reflected back to the receiving means, the display activates an alarm indicative of an obstacle between the tow vehicle and draft vehicle;
   e. means controlling said visual display to show said first and second images in proportional relationship to one another, said means for controlling said visual display being responsive to said signals, said images comprising a first silhouette representative of the tow vehicle, and a second silhouette representative of the draft vehicle.

2. The aid according to claim 1, one of said first silhouette and said second silhouette remaining stationary on said screen, and the other of said first silhouette and said second silhouette being caused to move on said screen by said means for controlling said visual display, responsive to said signals.

3. The aid according to claim 1, said second image including a visual center line, and said visual display including a grid fixed in relation to said first image, whereby angular relationship between said first image and said second image is more readily discerned.

4. The aid according to claim 1, further including a proximity annunciator for annunciating the distance between the tow vehicle and the draft vehicle.

5. The aid according to claim 1, said projected energy comprising radar signals.

6. The aid according to claim 1, said means for controlling said visual display comprising a microprocessor for converting signals received from said sensing means into signals generating images upon said visual display.

7. An aid for a driver backing a tow vehicle up to a draft vehicle, comprising:
   a. means for sensing the relative positions of the tow and draft vehicle and generating signals responsive thereto, said sensing means mounted upon the tow vehicle;
   b. said sensing means comprising an infrared transmitter which transmits a signal to a draft vehicle which reflects from reflecting means on the tow vehicle back to the draft vehicle;
   c. a visual display receiving an output from said receiving means and displaying a first image representative of the tow vehicle and a second image representative of the draft vehicle;
   d. and whereby if no signal is reflected back to the receiving means, the display activates an alarm indicative of an obstacle between the tow vehicle and draft vehicle;
   e. means controlling said visual display to show said first and second images in proportional relationship to one another, said means for controlling said visual display being responsive to said signals, said images comprising a first silhouette representative of the tow vehicle, and a second silhouette representative of the draft vehicle;
   f. a proximity annunciator for annunciating the distance between the tow vehicle and the draft vehicle.

* * * * *